US006192860B1

(12) United States Patent
Hatlen

(10) Patent No.: US 6,192,860 B1
(45) Date of Patent: Feb. 27, 2001

(54) ENGINE SPEED CONTROL APPARATUS AND METHOD

(75) Inventor: Richard P. Hatlen, Waterford, WI (US)

(73) Assignee: Case Corporation, Racine, WI (US)

( * ) Notice: Subject to any disclaimer, the term of this patent is extended or adjusted under 35 U.S.C. 154(b) by 0 days.

(21) Appl. No.: 09/370,965

(22) Filed: Aug. 10, 1999

(51) Int. Cl.[7] ............................ F02D 41/00; F01B 25/02; G01G 1/14; G01G 11/00

(52) U.S. Cl. .............................. 123/352; 74/482; 74/513; 123/357; 123/361

(58) Field of Search .................................... 123/352–357, 123/361, 399; 74/513, 482

(56) References Cited

U.S. PATENT DOCUMENTS

| | | | | |
|---|---|---|---|---|
| 3,682,145 | * | 8/1972 | Ohtani | 123/357 |
| 4,615,409 | * | 10/1986 | Kupper et al. | 123/399 X |
| 4,671,235 | * | 6/1987 | Hosaka | 123/352 |
| 6,041,673 | * | 3/2000 | Schmillen | 74/482 |

* cited by examiner

*Primary Examiner*—Tony M. Argenbright
(74) *Attorney, Agent, or Firm*—Foley & Lardner

(57) ABSTRACT

There is provided in accord with the present invention a work vehicle comprising a vehicle support structure upon which a plurality of wheels are rotatably mounted and which structure supports an engine having a fuel injection system operatively coupled to at least two of the wheels. The engine is provided with an engine speed control system in electrical communication with the engine and comprising a controller operatively connected to the fuel injection system with the controller receiving feedback signals from an engine transducer to control engine speed in response to an actuator operatively connected to a potentiometer. The potentiometer is electrically connected to the controller and responsive, proportionately, to the movement of the actuator. The actuator can be operated in a first mode or a second mode as determined by a selector operatively connected to the actuator and the controller, wherein the first mode is an accelerator mode and the second mode is a decelerator mode such that when the accelerator mode is selected the engine speed will increase as the actuator is moved from a first position to a second position and when the deceleration mode is selected, the engine speed will decrease as the actuator is moved from the first position to the second position.

10 Claims, 3 Drawing Sheets

ENGINE SPEED CONTROL APPARATUS AND METHOD

FIELD OF THE INVENTION

The present invention relates to controls for internal combustion engines, and more particularly, to an engine speed control apparatus and method for a work vehicle.

BACKGROUND OF THE INVENTION

Typical work vehicles, such as agricultural tractors, control the speed of the engine by limiting the amount of fuel into the engine cylinders for combustion. A controller provides a signal to, for instance, a fuel injection system that adjusts the amount of fuel delivered to the engine. The signal is generally produced by a transducer connected to a lever or an accelerator pedal (the "gas pedal") that proportionately responds to the movement of the accelerator pedal or lever. In some circumstances the operator of the work vehicle would desire the "gas pedal" to respond as an accelerator and in some circumstances to respond as a decelerator. In either instance, it is desirable to use the same motion of the "gas pedal" to achieve either response.

Thus, there is a continuing need for a system that would allow the fuel control actuator of a work vehicle to function in either an accelerator mode or a decelerator mode, without changing the usual motion of such actuator.

SUMMARY OF THE INVENTION

There is provided in accord with the present invention a work vehicle comprising a vehicle support structure upon which a plurality of wheels are rotatably mounted and which structure supports an engine having a fuel injection system operatively coupled to at least two of the wheels. The engine is provided with an engine speed control system in electrical communication with the engine and comprising a controller operatively connected to the fuel injection system with the controller receiving feedback signals from an engine transducer to control engine speed in response to an actuator operatively connected to a potentiometer. The potentiometer is electrically connected to the controller and responsive in relation to (proportionately) the movement of t he actuator. The actuator can be operated in a first mode or a second mode as determined by a selector operatively connected to the actuator and the controller, wherein the first mode is an accelerator mode and the second mode is a decelerator mode such that when the accelerator mode is selected the engine speed will increase as the actuator is moved from a first position to a second position and when the deceleration mode is selected, the engine speed will decrease as the actuator is moved from the first position to the second position. The actuator can be a pedal or a lever and the selector switch can be a toggle switch, a push button switch, a slide switch, a rotary switch, an electronic switch or a voice actuated circuit. One embodiment of the present invention includes a range selector operatively connected to the controller with the range selector designating a range of engine speed within which the actuator will operate regardless of whether the engine speed control apparatus is in the first mode or the second mode.

Before explaining the preferred embodiment of the invention in detail, it is to be understood that the invention is not limited in the application to the details of construction and the arrangement of components set forth in the following description or as illustrated in t he drawings. The invention is capable of other embodiments or being practiced or carried out in various ways. Also, it is to be understood that the phraseology and terminology employed herein is for the purpose of description and should not be regarded as limiting.

DETAILED DESCRIPTION OF THE PREFERRED EMBODIMENT

Figure 1:
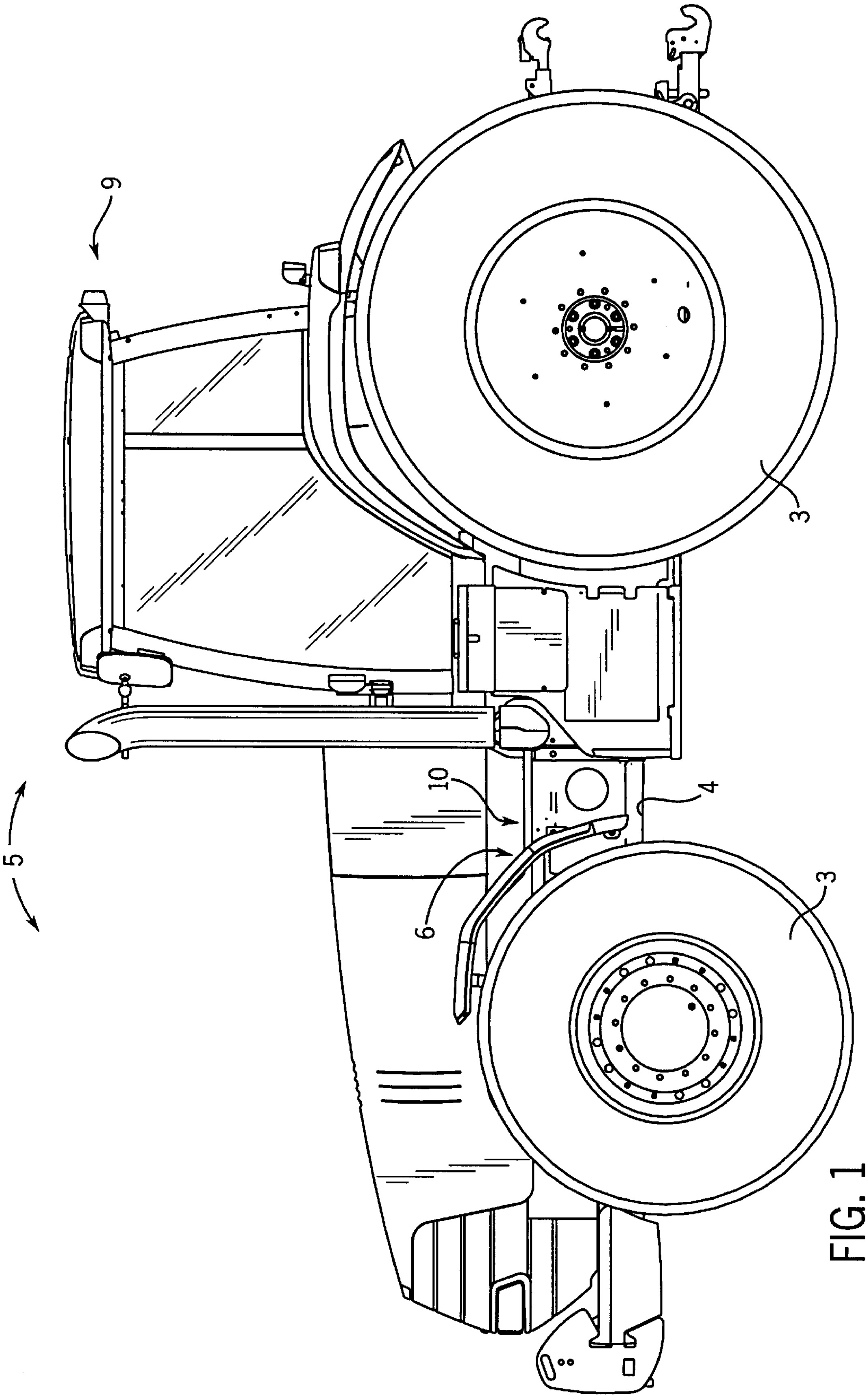
FIG. 1 illustrates a work vehicle having an engine with the prefer red embodiment of an engine speed control system.

Referring to FIG. 1, there is illustrated an agricultural tractor-type of work vehicle 5. The work vehicle 5 comprises a work vehicle support structure 4 to which a plurality of wheels 3 are rotatably mounted. The work vehicle 5 also has an engine 6 with a fuel injection system 7 mounted on the vehicle support structure 4 and operatively coupled to at least two of the wheels 3. The work vehicle 5 is also provided with a cab 9 in which the operator controls and manipulates the work vehicle 5 and any function or implement associated with the work vehicle 5. The engine 6 can be either a gasoline or diesel fueled internal combustion engine and the work vehicle 5 may be either a two or four wheel drive power train with as many as eight wheels.

Figure 2:
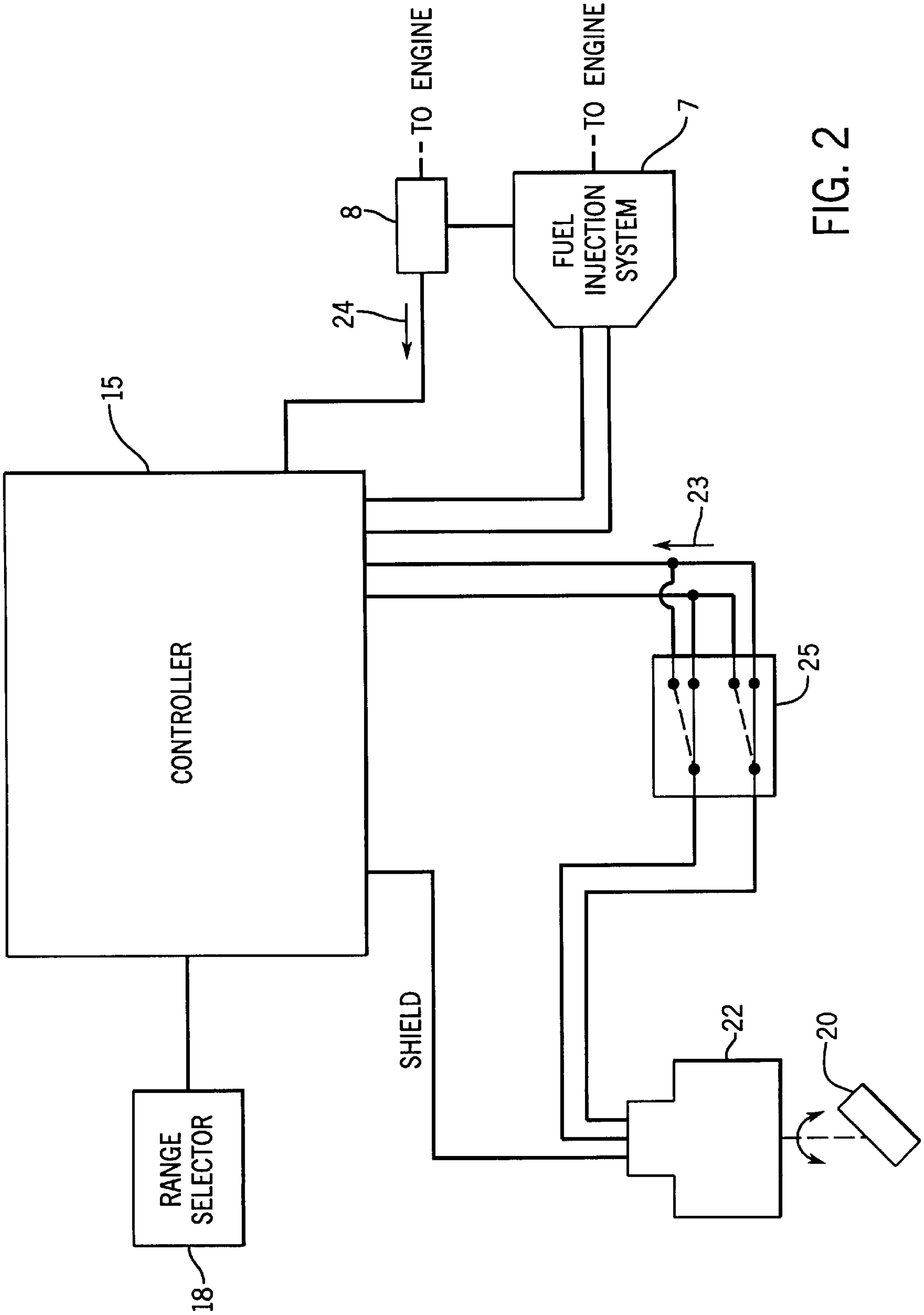
FIG. 2 is a block schematic of the preferred embodiment of the engine speed control apparatus.
Figure 3:
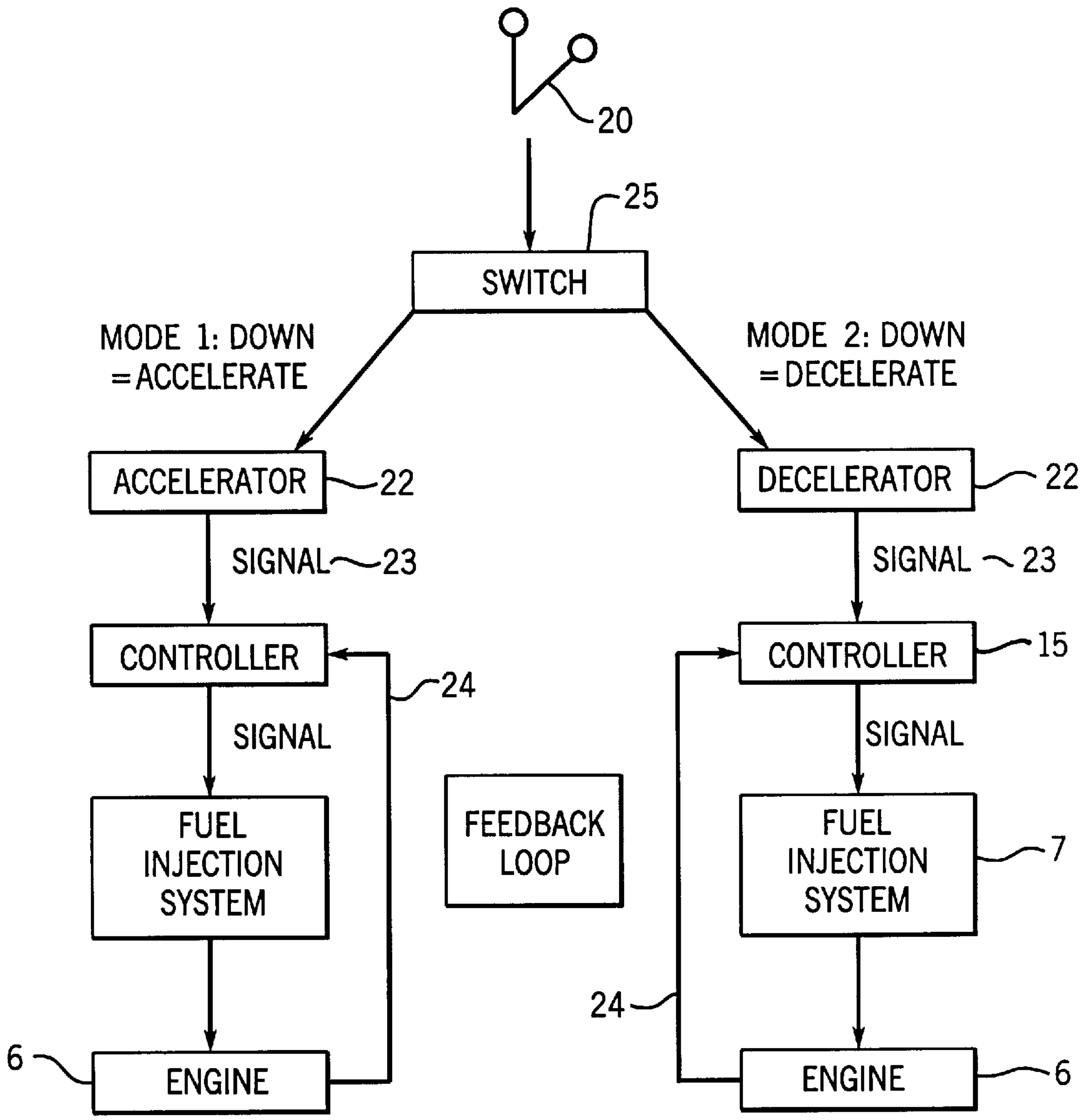
FIG. 3 is a diagram showing two modes of operation of an engine speed control apparatus.

The engine speed control apparatus 10 is in electrical communication with the engine 6. As illustrated in FIGS. 2 and 3, the engine speed control apparatus 10 comprises a controller 15 that is operatively connected to the fuel injection system 7 with the controller 15 receiving feedback signals 24 from an engine transducer 8 to control engine speed. An actuator 20 is operatively connected to a potentiometer 22 which is electrically connected to the controller 15. The potentiometer 22 produces a signal 23 that is responsive and related to (e.g. proportional to) the movement of the actuator 20 from a first position to a second position and back again. The signal 23 can be either a digital or analog signal. A selector switch 25 for setting a first mode and a second mode is operatively connected to the actuator 20 and the controller 15. For purposes of illustration, mode 1 is designated an accelerate mode and mode 2 is designated a decelerate mode. By way of example selector 25 may be a switch selected from a group comprising a toggle switch, a push button switch, a slide switch, a rotary switch, an electronic switch and voice activated circuit. The selector 25 may also be a mechanical device operatively connected to a linkage coupled to the actuator 20 and the controller 15 The selector 25 can be operative from the cab 9 of the work vehicle 5 to select either the first mode or the second mode as determined by the operator of the work vehicle 5. The engine speed control apparatus 10 may also be provided with another input signal activated by a device, such as the vehicle brake pedal, to reverse the response of the speed control apparatus 10. In other words, if the speed control system is in the second mode, the system could be switched to the first mode by depressing the brake pedal.

The selector 25 would preferably be hand operated but could be integral or associated with the brake switch of the work vehicle 5 such that activation of the brake would cause a change to the other mode of the engine speed control apparatus 10. In the preferred embodiment, selector 25 is external to the controller 15 which changes the polarity of the potentiometer 22. In mode 1, the actuator 20, i.e., the "gas pedal" functions as a typical "gas pedal" in that as the actuator is moved towards the floor of the cab 9, the signal 23 sent to the controller 15 indicates that the operator of the work vehicle 5 desires an increase in speed and therefore more fuel is injected into the engine 6 by the fuel injection system 7. As the operator of the cab reverses the action of the actuator 20 less fuel is injected into the engine and the speed of the engine of the work vehicle 5 decreases.

If the operator of the work vehicle 5, using the selector switch 25, selects mode 2, the actuator 20 will operate in the decelerator mode. When the decelerator mode is selected, the polarity of the actuator 20 is reversed from that of mode 1 and the controller 15 reads the signal 23 when the pedal is not depressed as being associated with a predetermined speed (e.g. the highest engine idle speed). As the operator of the work vehicle 5 depresses the actuator 20, the controller 15 sends a signal 23 to the fuel injection system 7 that indicates less fuel should be injected into the engine 6 by the fuel injection system 7 with a resulting decrease in speed. As the operator reverses the motion of the actuator 20, the controller will send a signal to the fuel injection system 7 indicating additional fuel should be injected into the engine 6 and the speed of the engine will increase toward the high idle speed. In an alternative embodiment, a speed control arrangement may be provided to allow the operator to select the engine speed associated with the undepressed position of the pedal when in mode 2.

In some applications, the actuator 20 may be a pedal or a hand lever. In operation, an operator of the work vehicle 5 will start the engine 6 of the vehicle 5, after the engine is started the operator can select either a first or second mode of operation with selector 25 which communicates the selection to a controller 15 operatively connected to the fuel injection system 7 of the engine 6. The selection is done by a selector switch 25. As the operator moves the actuator 20, the actuator 20 produces a control input signal 23 (either analog or digital) corresponding to the position of the actuator 20 in the work vehicle 5 which is sent to the controller 15. The controller 15 responds to the control input signal which permits the engine speed to react in relation to the selected mode by controlling the amount of fuel injected into the engine 6. The first mode of operation is an acceleration mode and the second mode is a deceleration mode such that when the acceleration mode is selected, the engine speed will increase as the actuator 20 is moved from a first position (un-depressed or un-actuated)to a second position (depressed or actuated) and when the deceleration mode is selected the engine speed will decrease as the accelerator 20 is moved from the first position to the second position. In either case, the first position is usually an up or raised position and the second position is a down or lower position. However, it should be understood that the orientation of such positions can be reversed as determined by the operator of the work vehicle 5. Another embodiment of the present invention includes the step of selecting a range of engine speed for either the first mode or the second mode. The range of engine speed is selected by a range selector 18 which controls the RPM range of the engine.

Although the invention has been described in conjunction with specific embodiments thereof, it is evident that many alternatives, modifications and variations will be apparent to those ordinarily skilled in the art. Accordingly, it is intended to embrace all such alternatives, modifications and variations that fall within the spirit and scope of the appended claims.

What is claimed is:

1. An engine speed control apparatus for at least one engine in a vehicle, said engine speed control apparatus comprising:

a controller operatively connected to the engine;

an actuator operable to control engine speed;

a range selector operatively connected to the controller, the range selector designates a range of engine speed within which the actuator will operate regardless of mode; and, a selector operatively connected to the actuator and the controller to selectively modify the affect of actuator actuation on engine speed control wherein the selector provides an accelerator mode and a deceleration mode such that when the accelerator mode is selected the engine speed will increase as the actuator is moved from a first position to a second position and when the deceleration mode is selected, the engine speed will decrease as the actuator is moved from the first position to the second position.

2. The engine speed control apparatus of claim 1 wherein the selector is selected from a group comprising a toggle switch, a push button switch, a slide switch, a rotary switch, an electronic switch and a voice activated circuit.

3. The engine speed control apparatus of claim 1 including a second input signal activated by a device operatively connected to the apparatus to reverse the response of the apparatus from one mode to a second mode.

4. A work vehicle comprising:

a vehicle support structure;

a plurality of wheels rotatably mounted on the vehicle support structure;

an engine with a fuel injection system mounted on the vehicle support structure and operatively coupled to at least two of the wheels; and, an engine speed control system in electrical communication with the engine, the engine speed control comprising:

a controller operatively connected to the fuel injection system with the controller receiving feedback signals from an engine transducer to control engine speed;

an actuator operatively connected to a potentiometer, the potentiometer electrically connected to the controller and responsive to movement of the actuator;

a range selector operatively connected to the controller, the range selector designates a range of engine speed within which the actuator will operate regardless of mode; and a selector for setting a first mode and a second mode, the selector operatively connected to the actuator and the controller, wherein the first mode is an accelerator mode and the second mode is a deceleration mode such that when the accelerator mode is selected the engine speed will increase as the actuator is moved from a first position to a second position and when the deceleration mode is selected the engine speed will decrease as the actuator is moved from the first position to the second position.

5. The work vehicle of claim 4, wherein the selector is selected from a group comprising a toggle switch, a push bottom switch, a slide switch, a rotary switch, an electronic switch and a voice activated circuit.

6. The work vehicle of claim 4 including a second input signal activated by a device operatively connected to the apparatus to reverse the response of the apparatus from one mode to a second mode.

7. A method of engine speed control in a work vehicle having an engine with a fuel injection system, the method comprising the steps of:

starting the engine of the vehicle;

selecting one of a first mode of operation and a second mode of operation and conveying such selection to a controller operatively connected to the fuel injection system;

selecting a range of engine speed for either the first mode or second mode;

producing a control input signal corresponding to the position of an actuator in the work vehicle; and, responding to the control input signal for permitting the engine speed to react in relation to the selected mode by controlling the amount of fuel injected into the engine.

8. The method of claim 7 including the step of reversing the response of the engine speed control apparatus from one mode to a second mode with a second input signal activated by a device operatively connected to the engine speed control apparatus.

9. A work vehicle having an engine with a fuel injection system responsive to an engine speed control system, the engine speed control system comprising:

a means for controlling the speed of the engine in response to feedback signals received from an engine transducer;

a means for producing a signal, such means operatively connected to a means for actuating;

a means for designating a range of engine speed within which the means for actuating will operate; and, a means for selecting between a first mode and a second mode with such means operatively connected to the means for producing a signal and the means for controlling the speed of the engine.

10. The work vehicle of claim 9, including a means for reversing the response of the engine speed control apparatus from the one mode to a second mode.

* * * * *